Jan. 20, 1948.  F. E. KNIGHT  2,434,660
TOOL FOR ROTATING THREADED ARTICLES
Filed March 21, 1946
Fig-1-
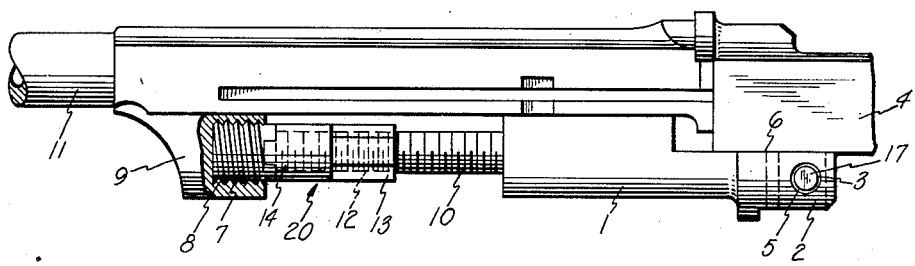
Fig-2-
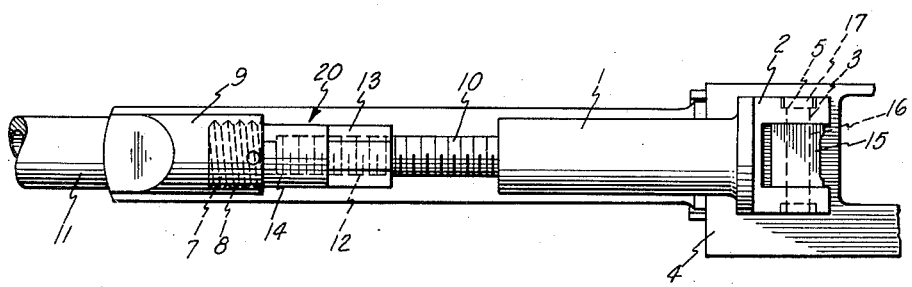
Fig-3-
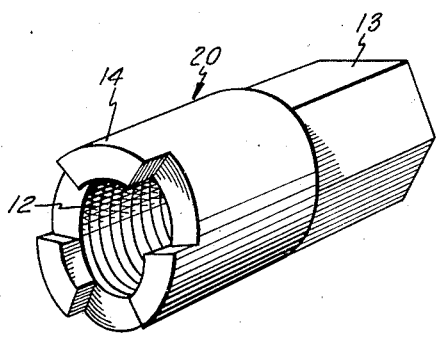
Fig-4-
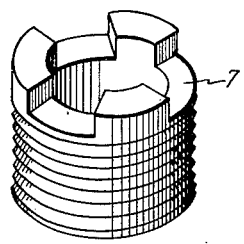
Inventor
Frank E. Knight
By J. H. Church + A. E. Thibodeau
Attorneys

UNITED STATES PATENT OFFICE 2,434,660

TOOL FOR ROTATING THREADED ARTICLES

Frank E. Knight, Northampton, Mass.

Application March 21, 1946, Serial No. 656,120

2 Claims. (Cl. 81—90)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an assembly tool and more particularly to a tool for assembling a threaded component.

When assembling certain components to an article of manufacture there is frequently encountered a component which is particularly difficult to assemble. This is especially true of bolts or nuts secured in inaccessible places. The conventional wrench or screw driver for use in removal of such components from such inaccessible places is either extremely difficult or impossible to use.

Accordingly, it is an object of this invention to provide a tool for assembling (or disassembling) certain threaded components to an article of manufacture.

A particular object of this invention is to provide an assembly tool for assembling the piston nut to a firearm known as the U. S. carbine, cal. .30, M1.

The specific nature of the invention as well as other objects and advantages thereof will clearly appear from a description of a preferred embodiment as shown in the accompanying drawings in which:

Fig. 1 is a side elevational view of the assembly tool shown in assembled relation to a firearm for removal of the threaded nut;

Fig. 2 is a view similar to Fig. 1 but rotated 90° to better show the manner of securing such tool to the receiver of a firearm;

Fig. 3 is a perspective view of the driver showing the castellated end thereof; and Fig. 4 is a perspective view of the castellated piston retaining nut.

In Fig. 1 there is shown in assembled relation an assembly tool embodying this invention. The tool shown in such figure comprises mainly a body 1, a screw 10, and a driver 20. In the preferred application such tool is utilized to assemble or remove the piston retaining nut of a firearm known as the U. S. carbine M1. Such is only a specific example however and should not be construed as limiting the invention to such application as the scope of the invention is sufficiently broad to include numerous similar applications.

Body 1 is a cylindrical member provided on one end with a bifurcated head 2. On the other end of such body, screw 10 is preferably integrally formed therewith and axially disposed thereto. A transverse hole 3 is provided on head 2 for mounting such head to a receiver 4 of a firearm as will be later described. Each end of hole 3 is counterbored as shown at 5 in Fig. 2. A flat portion 6 is provided on one side of body 1 and head 2 as shown in Fig. 1 to clear the bottom of receiver 4 when such tool is fastened to receiver 4.

The screw 10 integrally formed with body 1 is provided with a thread having a lead identical with that of a piston retaining nut 7. Such nut is screwed into a threaded hole 8 in a gas cylinder 9 provided on the underside of a barrel 11 of a firearm as illustrated in Fig. 1. Driver 20 is provided with a threaded axial hole 12 and such driver is screwed on to screw 10. The upper half of driver 20 is preferably of hexagonal shape as shown at 13 to permit a conventional open end wrench or other type of wrench to be placed about driver 20 to facilitate turning thereof. The lower end 14 of driver 20 is notched or castellated as shown in Fig. 3. Such notches correspond to the notched or castellated end of nut 7. Thus when the notched end 14 of driver 20 is in engagement with nut 7, nut 7 can be readily screwed in or removed as will be presently described.

To assemble or remove nut 7 from the cylinder 9 of the firearm shown in Figs. 1 and 2, the notched end 14 of driver 20 is placed in engagement with nut 7. The bifurcated end of head 2 of body 1 is then placed about an integral lug 15 provided on the underside of receiver 4. A transverse hole 16 is provided in lug 15. When head 2 of body 1 surrounds lug 15 and hole 3 is in alignment with hole 16, a headed pin 17 is inserted through hole 3 and hole 16 to secure body 1 to the underside of receiver 4. The head of headed pin 17 rests within one of the counterbored ends 5 of hole 3. Thus the tool is mounted in position for assembly or removal of piston nut 7. To remove such nut a conventional wrench is placed about the hexagonal portion 13 of driver 20 and such driver is rotated. Such rotation turns nut 7, this being possible because the lead of the thread provided on screw 10 is identical to that of nut 7.

From the foregoing description it is readily apparent that there is hereby provided a convenient tool for use in assembling or disassembling the piston nut of the U. S. carbine, cal. .30, M1. It is also apparent that such a tool can be readily modified to remove a screw or nut from a similarly difficult inaccessible location and yet lie within the scope of this invention.

I claim:

1. A tool for rotating a threaded nut for assembly to the gas cylinder of a firearm having a barrel, a receiver, a depending lug on the receiver, the gas cylinder being in depending relation to the barrel and relatively inaccessible, said tool comprising, a body, a bifurcated head on one end of said body arranged to straddle the lug on the receiver of the firearm to non-rotatively secure the body to the firearm, a screw extending from the other end of said body and arranged to underlie the barrel of the firearm, said screw having a lead of thread corresponding to the lead of thread on the threaded nut, a driver threadably mounted on said screw, means on said driver for engaging said threaded nut, and means on said driver for engagement by a tool whereby rotation of said driver effects rotation of said threaded nut for assembly or removal thereof to the gas cylinder.

2. A tool for rotating a castellated threaded nut for assembly to the gas cylinder of a firearm having a barrel, a receiver, a depending lug on the receiver, the gas cylinder being in depending relation to the barrel and relatively inaccessible, said tool comprising, a body, a bifurcated head on one end of said body arranged to straddle the lug on the receiver of the firearm to non-rotatively secure the body to the firearm, a screw extending from the other end of said body and arranged to underlie the barrel of the firearm, said screw having a lead of thread corresponding to the lead of thread on the castellated threaded nut, a driver threadably mounted on said screw, said driver having a castellated end adapted to engage said castellated threaded nut, and a plurality of flats on said driver for engagement by a tool whereby rotation of said driver effects rotation of said castellated threaded nut for assembly or removal thereof to the gas cylinder.

FRANK E. KNIGHT.

REFERENCES CITED

The following references are of record in the file of this patent:

UNITED STATES PATENTS

| Number | Name | Date |
|---|---|---|
| 701,948 | Senn | June 10, 1902 |
| 1,458,076 | Potts | June 5, 1923 |
| 1,846,099 | Graham | Feb. 23, 1932 |
| 2,033,892 | Parvin | Mar. 10, 1936 |
| 2,267,012 | Bowne | Dec. 23, 1941 |

FOREIGN PATENTS

| Number | Country | Date |
|---|---|---|
| 6,155 | Great Britain | Mar. 15, 1909 |